United States Patent
Reese et al.

(10) Patent No.: US 8,203,731 B2
(45) Date of Patent: Jun. 19, 2012

(54) HARD IMAGING DEVICES, AND HARD IMAGING DEVICE FILE SYSTEM ACCESSING AND SHARING METHOD

(75) Inventors: Curtis Reese, Boise, ID (US); Shane Konsella, Star, ID (US); Daniel Travis Lay, Horseshoe Bend, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3184 days.

(21) Appl. No.: 10/458,888

(22) Filed: Jun. 10, 2003

(65) Prior Publication Data

US 2004/0254955 A1    Dec. 16, 2004

(51) Int. Cl.
G06F 3/12 (2006.01)
G06F 3/00 (2006.01)
G06F 15/16 (2006.01)
G06F 17/00 (2006.01)

(52) U.S. Cl. ............ 358/1.15; 715/738; 709/208; 726/1
(58) Field of Classification Search ............... 358/1.15; 709/217, 208; 707/210, 104.1; 715/738
See application file for complete search history.

(56) References Cited

U.S. PATENT DOCUMENTS

| | | | |
|---|---|---|---|
| 5,956,487 A * | 9/1999 | Venkatraman et al. | 709/218 |
| 6,256,666 B1 | 7/2001 | Singhal | |
| 6,542,892 B1 * | 4/2003 | Cantwell | 707/10 |
| 6,636,891 B1 * | 10/2003 | LeClair et al. | 709/208 |
| 7,249,369 B2 * | 7/2007 | Knouse et al. | 726/1 |
| 2003/0081242 A1 * | 5/2003 | Simpson et al. | 358/1.15 |

* cited by examiner

*Primary Examiner* — David K Moore
*Assistant Examiner* — Neil R McLean

(57) ABSTRACT

Hard imaging devices, hard imaging systems, articles of manufacture, hard imaging device file system accessing methods, hard imaging device file system sharing methods are described. According to one aspect, a hard imaging device comprises a communications interface configured to communicate with a communications medium external of the hard imaging device, an image engine configured to form hard images using media, a file system configured to store a plurality of electronic files, processing circuitry having a server system configured to communicate with the file system and at least an external management device or a computer device, and wherein communication with at least the external management device or the computer device is performed using a web sharing protocol.

16 Claims, 4 Drawing Sheets

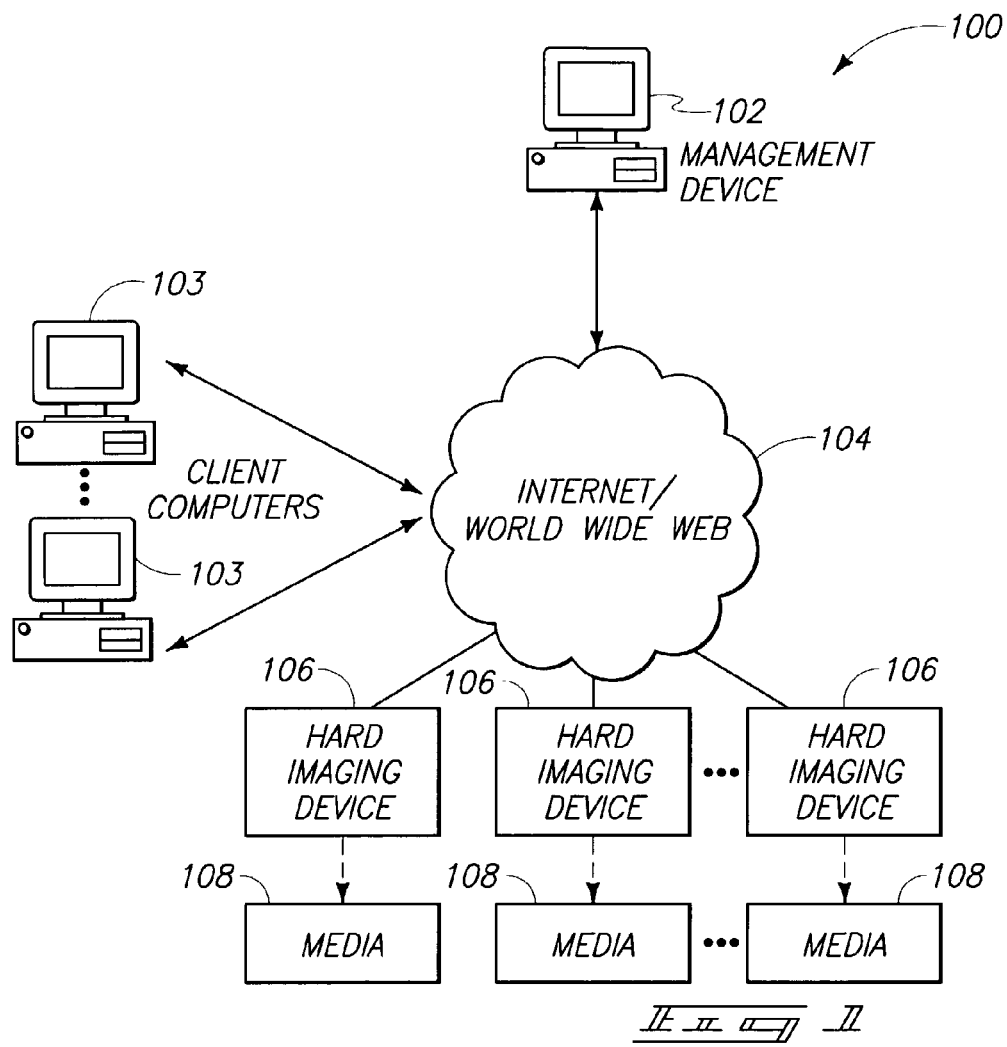
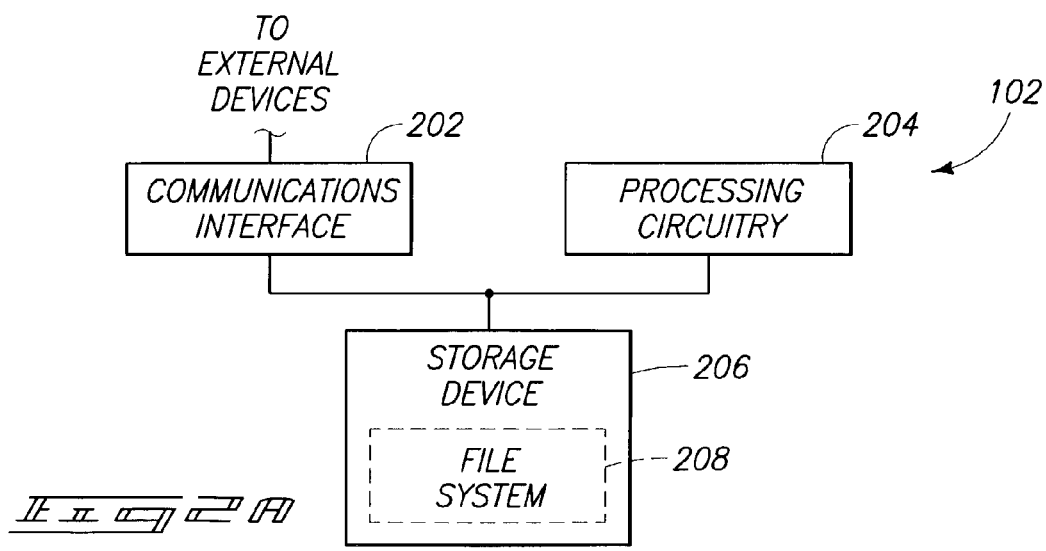

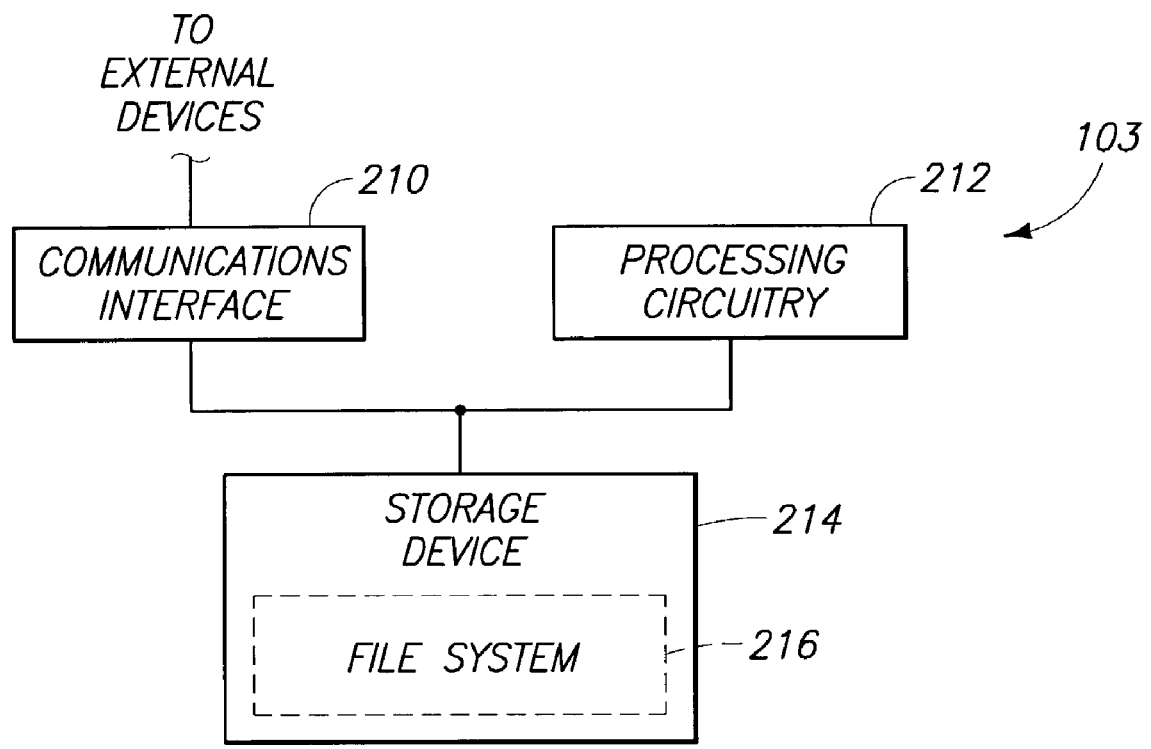
F I G 2 B

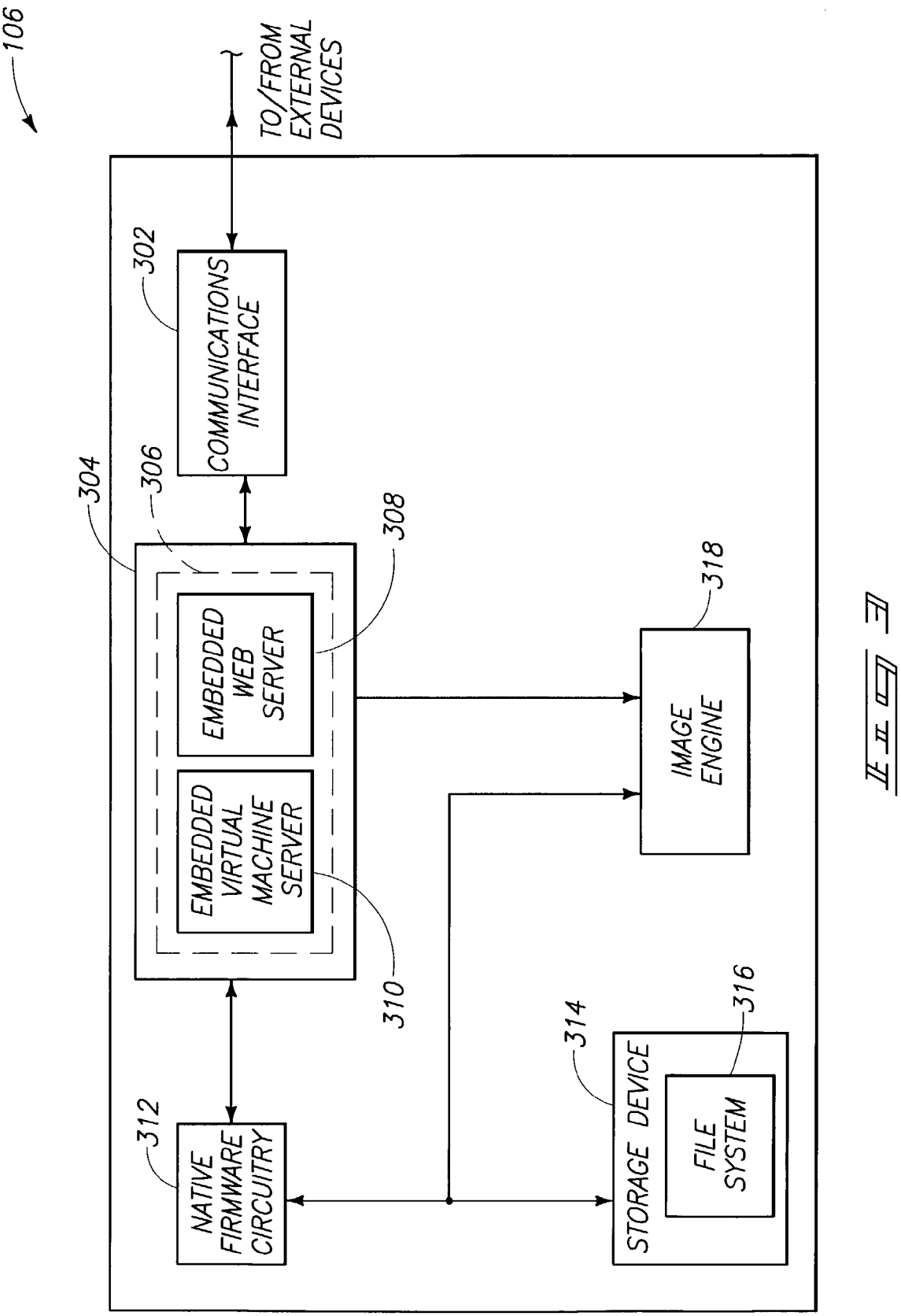

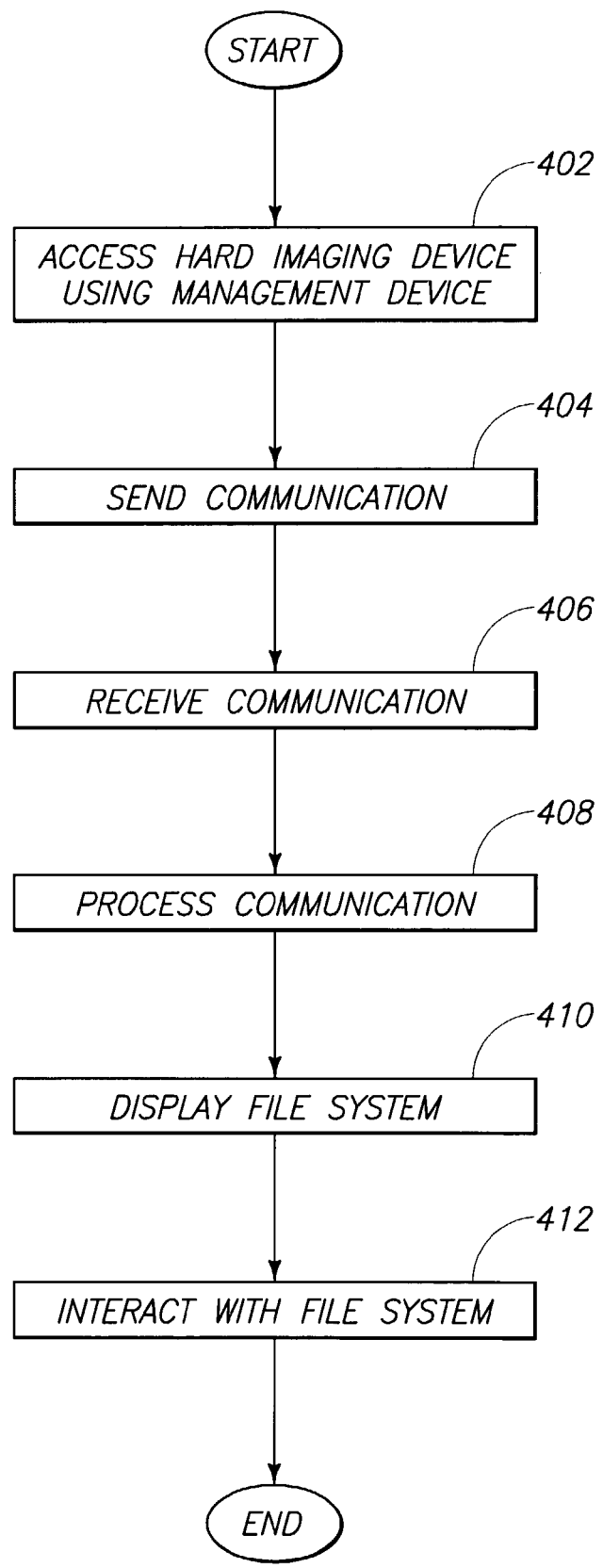

HARD IMAGING DEVICES, AND HARD IMAGING DEVICE FILE SYSTEM ACCESSING AND SHARING METHOD

FIELD OF THE INVENTION

Aspects of the invention relate to hard imaging devices, hard imaging systems, articles of manufacture, hard imaging device file system accessing methods, and hard imaging device file system sharing methods.

BACKGROUND OF THE INVENTION

Computer systems including personal computers, workstations, hand held devices, etc. have been utilized in an increasing number of applications at home, the workplace, educational environments, entertainment environments, etc. Peripheral devices of increased capabilities and performance have been developed and continually improved upon to extend the functionality and applications of computer systems. For example, imaging devices, such as printers, have experienced significant advancements including refined imaging, faster processing, and color reproduction.

Some imaging device configurations have become more sophisticated as the capabilities and performance increase. These devices may utilize programming, such as firmware, to implement various imaging operations including determining imaging device status and navigating imaging file systems. In one exemplary approach, status of an image device (e.g., printer) is determined by issuing file system commands written using Hewlett-Packard's Printer Job Language (PJL) to manipulate a file system of the printer. However, manipulation of the file system using PJL lacked user friendliness and involved difficulties in displaying results produced by user commands issued to the image device. Furthermore, prior systems lacked sharing the file system of the image device with other users of the image device.

Aspects described herein provide improved hard imaging devices, hard-imaging systems, hard imaging device file system accessing methods, and hard imaging device file system sharing methods.

SUMMARY OF THE INVENTION

Hard imaging devices, hard imaging systems, articles of manufacture, hard imaging device file system accessing methods, and hard imaging device file system sharing methods are described.

According to one aspect, a hard imaging device includes a communications interface configured to communicate with a communications medium external of the hard imaging device, and an image engine configured to form hard images using media. The hard imaging device of this aspect also includes a file system configured to store a plurality of electronic files, and processing circuitry having a server system configured to communicate with the file system and at least an external management device or a computer device. Communication with at least the external management device or the computer device is performed using a web sharing protocol.

According to another aspect, a hard imaging system is described. The hard imaging system includes one or more client computers communicatively coupled to a communications medium, and a plurality of hard imaging devices individually having a communications interface configured to communicate with the communications medium external of the respective hard imaging device. The hard imaging system of this aspect also includes an image engine configured to form hard images using media, a file system configured to store a plurality of electronic files, and processing circuitry having a server system configured to communicate with the file system and a management device or a client computer. Communication with the management device or the client computer may be performed using a web sharing protocol, and the management device and the client computer individually may have a communications interface configured to communicate with the communications medium and the hard imaging devices. The processing circuitry may be configured to access and display the file systems of the respective hard imaging devices.

According to a further aspect, a hard imaging device file sharing method is disclosed. The method of this aspect includes providing a hard imaging device communicatively coupled with a communication network, and configuring a management device to access the hard imaging device using an internet protocol. The method further of this aspect includes enabling a user of the management device to browse and display a file system of the hard imaging device on a user interface of the management device, and enabling the user to select contents of the file system for sharing with other users having access to the hard imaging device.

Other aspects are disclosed.

DESCRIPTION OF THE DRAWINGS

FIG. 1 is a functional block diagram of a hard imaging system according to one embodiment.

FIG. 2A is a functional block diagram of a hard imaging management device according to one embodiment.

FIG. 2B is a functional block diagram of a client computer configured to access the hard imaging device according to one embodiment.

FIG. 3 is a functional block diagram of a hard imaging device according to one embodiment.

FIG. 4 is a flow chart of a methodology executable by a hard imaging device according to one embodiment.

DETAILED DESCRIPTION OF THE INVENTION

Referring to FIG. 1, an exemplary hard imaging system 100 arranged according to one embodiment is shown. The depicted hard imaging system 100 includes a hard imaging management device 102, one or more client computers 103, a communications medium 104, and one or more hard imaging devices 106. In one arrangement, at least some of devices 102, 103, 106 are provided at locations physically separated from one another.

The hard imaging management device 102, and/or individual ones of client computers 103, may be configured to monitor and modify, such as, for example, file system access privileges of hard imaging devices 106 as described further below. In one embodiment, a client computer 103 may be configured to have privileges to monitor and modify file system privileges of individual ones of the hard imaging devices 106. For discussion purposes, a client computer 103 having an ability to modify access privileges to a file system of the hard imaging device 106 is generally referred to as the management device 102, and the other computers having no such privileges are generally referred to as the client computers 103. Some arrangements may include a plurality of management devices 102. These examples of the management device and the client computers are for purposes of illustration only. Other combinations of the management device 102 and client computers 103, to modify file system access privileges of individual ones of hard imaging devices 106, are possible.

For example, if the management device 102 is configured to have privileges to monitor and modify an individual hard imaging device 106, the client computers 103 may be considered as users of the hard imaging device 106 sharing resources of the hard imaging device 106. It will, however, be appreciated that any of the client computers 103 may be configured to perform the functions of the management device 102, and in such a case, the management device 102 may be configured as a client computer 103 to share the resources of the hard imaging device 106. Exemplary modifications to the hard imaging device include modifications performed to the access privileges of the file system of the hard imaging device 106 including configuring one or more electronic files of the file system for sharing with other users of the hard imaging device 106 located, for example, at the client computers 103.

The management device 102 and the client computers 103 may individually be configured as a server computer, such as a web-enabled server, in one arrangement. Other configurations of management device 102 and the client computers 103 are possible. Further details regarding an exemplary configuration of management device 102 are described below with respect to FIG. 2A.

Communications medium 104 is configured to implement bi-directional communications between management device 102, the client computers 103, and individual ones of hard imaging devices 106. Communications medium 104 may be configured in any suitable manner to provide communication of electronic data, programming or other information between communicatively coupled devices. For example, communications medium 104 may comprise private and/or public networked components, (e.g., internet, World Wide Web, communications network using an HTTP protocol format, etc.).

Hard imaging devices 106 are configured to form hard images. Hard images comprise images physically rendered upon output media 108, such as sheet paper, roll paper, envelopes, transparencies, labels, etc. Hard imaging devices 106 may be implemented as laser printers, inkjet printers, impact printers, copiers, facsimile devices, multiple function peripheral (MFP) devices, or any other configuration arranged to form hard images. Hard imaging devices 106 may have the same or different configurations in a given implementation of system 100. Additional details regarding an exemplary configuration of one of hard imaging devices 106 are described below with respect to FIG. 3.

Referring to FIG. 2A, further details of an exemplary hard imaging management device 102 are shown. As noted above, if any one of the client computers 103 is configured as a management device, then such client computer may be considered to include the details of the management device 102 described with respect to FIG. 2A. The illustrated management device 102 comprises a communications interface 202, processing circuitry 204, and a storage device 206.

Communications interface 202 is configured to communicate electronic data externally of management device 102, for example, with respect to communications medium 104 and devices 106. In one embodiment, interface 202 is arranged to provide input/output communications with respect to external devices, such as hard imaging devices 106. Interface 202 may comprise a parallel port, USB port, EIO slot, network interface card (e.g., JetDirect™), IEEE 1394 connector, and/or other appropriate configuration capable of communicating electronic data.

Processing circuitry 204 is configured to process data and control management operations of hard imaging system 100. In one embodiment, processing circuitry 204 may comprise circuitry configured to execute provided programming. For example, processing circuitry 204 may be implemented as a microprocessor or other structure configured to execute executable instructions of programming including, for example, software and/or firmware instructions. Other exemplary embodiments of processing circuitry 204 include hardware logic, PGA, FPGA, ASIC, and/or other structures. These examples of processing circuitry 204 are for illustration and other configurations are possible for implementing operations discussed herein.

Storage device 206 is configured to store electronic data, file systems having one or more electronic files, programming such as executable instructions (e.g., software and/or firmware), and/or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

As illustrated in the depicted example, storage device 206 is configured to store data regarding a file system (e.g., reference character 316 of FIG. 3) of one or more of hard imaging devices 106. Representations of file systems 316 may be provided and referred to as file systems 208. Individual file systems 208 may correspond to respective individual file systems 316 (FIG. 3) of hard imaging devices 106.

In one embodiment, file systems 208 may be provided by mapping file system 316 (FIG. 3) using management device 102. Other implementations for accessing or representing file systems 316 of hard imaging devices 106 are possible (e.g., logical mounting). As described in detail below, management device 102 is configured to modify access privileges of file system 316 (FIG. 3) of one or more hard imaging device 106. Further details regarding displaying or mapping file system 316 to file system 208 are described below with respect to FIG. 3.

FIG. 2B is a functional block diagram of a client computer 103 configured to access the hard imaging device 106 (FIG. 1) according to one embodiment. The client computer 103 includes a communications interface 210, processing circuitry 212, storage device 214 comprising an internal file system 216. In one embodiment, components 210, 212, 214 may be implemented using configurations of the exemplary components 202, 204, 206 described above. In the exemplary embodiment of FIG. 2B, the client computer 103 may not initially be provided with privileges to modify a file system 316 (FIG. 3) of the hard imaging device 106 (FIG. 1). After configuring the one or more files or directories of the file system 316 as shared files or directories by the management device 102 (FIG. 2A), a user of the client computer 103 may access the shared files or directories, modify their contents, or map the shared files or directories to a file system local to the client computer 103. Further details regarding these operations are provided below with respect to FIG. 3. In one embodiment, the processing circuitry 212 of the client computer 103 may be configured to provide a map to file system 316 (FIG. 3) of the hard imaging device 106 (FIG. 3).

FIG. 3 shows an exemplary configuration of hard imaging device 106. Hard imaging device 106 comprises a communications interface 302, processing circuitry 304, native firmware circuitry 312, storage device 314, and an image engine 318. The depicted example of hard imaging device 106 comprises a printer for discussion purposes. Other implementations are possible as mentioned previously.

Communications interface 302 is configured to communicate electronic data externally of hard imaging device 106. In one embodiment, interface 302 is arranged to provide input/output communications with respect to external devices (e.g., management device 102 and client computers 103), via for example, communications medium 104. Interface 302 may be configured similarly to communications interface 202 of management device 102 in one embodiment. Likewise, interface 302 may also be configured to communicate with a communications interface 210 of a client computer 103.

Processing circuitry 304 is configured to process image data and control operations of hard imaging device 106 (e.g., communications, imaging, file system modifications, etc.). Processing circuitry 304 may comprise circuitry configured to implement desired programming (e.g., a microprocessor or other structure configured to execute software and/or firmware instructions). Other exemplary embodiments of processing circuitry 304 include hardware logic, PGA, FPGA, ASIC, and/or other processing structures. These examples of processing circuitry are for illustration and other configurations are possible for processing image data and controlling operations of hard imaging device 106.

In one embodiment, processing circuitry 304 may execute programming of a server system 306 comprising an embedded web server 308, and an embedded virtual machine (EVM) server 310. In one example, the embedded web server 308 is configured to provide an environment for executing web programs, results of which may be displayed by a web browser (e.g., Internet Explorer or Netscape Navigator). The embedded web server 308 provides an interface to the hard imaging device 106 from an external source (e.g., management device 102 or client computer 103). For example, the embedded web server 308 may be configured to handle HTTP protocol requests received from external devices (e.g., management device 102 or client computer 103) to interact with the file system 316 of the hard imaging device 106 by converting the HTTP requests to an executable bytecode compatible with the embedded virtual machine server 310. In one example, the executable bytecode created by the embedded web server may include JAVA file system application program interfaces (JAVA APIs).

The embedded virtual machine server 310 is a real-time interpreter configured to create executable bytecode responsive to the executable bytecode received from the embedded web server 308. One possible embedded virtual machine program includes a Java Virtual Machine (JVM). The executable bytecode created by the embedded virtual machine server 310 is configured to interact with the file system 316 via native firmware circuitry 312 which converts commands received from the embedded web server 308 into respective native firmware format configured to interact with the file system 316 of the hard imaging device 106.

The embedded virtual machine server 310 (e.g., JAVA virtual machine server) enables an external device (e.g., management device 102 or client computer 103) of the hard imaging device 106 to interact with the native firmware circuitry 312 using standard file system commands of an application program such as, for example, JAVA without using commands proprietary to the native firmware circuitry 312 of the hard imaging device 106.

The embedded virtual machine server 310 may also be configured to receive information from the file system 316 in a native space format and convert the received information into an executable bytecode compatible with embedded web server 308 which in turn is configured to convert the received executable bytecode from the embedded virtual machine server 310 into an HTTP compatible format for displaying using a web browser on a display device of the management device 102 or the client computer 103.

Upon processing information (e.g., file system changes) from the embedded virtual machine server 310, the embedded web server 308 is configured to display the processed information on a web page of the hard imaging device 106. For example, if an HTTP request from an external device (e.g., client computer 103 or management device 102) referenced a folder selected for sharing on the web, then the resulting web page is configured to include a directory listing for that folder. Likewise, if an HTTP request referenced a file within a web-folder, then the resulting web page may be configured to display contents of the file, or an indication to save or open the file.

The native firmware circuitry 312 is created using an application program in order to implement interfaces between various components of the hard imaging device 106. In one example, the native firmware circuitry 312 may be written in $C^{++}$ programming language and configured to manage the file system 316, and perform memory management tasks, etc.

Storage device 314 is configured to store electronic data, programming such as executable instructions (e.g., software and/or firmware), and/or other digital information and may include articles of manufacture including processor-usable media described previously.

According to exemplary arrangements described herein, storage device 314 is configured to store a file system 316 comprising a plurality of electronic files. The electronic files may be configured into directories or sub-directories. At least some of the files may be pertinent to hard imaging operations of the respective hard imaging device 106. During hard imaging operations of hard imaging devices 106, respective processing circuits 304 may access electronic files of the respective file system 316. For example, exemplary files include fonts, electronic forms having modifiable fields, signature files, executable applications, programming supporting operation of the device 106 (e.g., software modules, firmware modules, etc.), and other electronic data usable by hard imaging device 106 to implement the formation of hard images and other functionality of device 106.

Image engine 318 is configured to form hard images upon output media 108 (FIG. 1). In one embodiment, image engine 318 comprises development and fusing assemblies configured to form the hard images using a marking agent, such as toner or ink. Image engine 318 may be configured to generate monochrome and/or color hard images. In exemplary printer embodiments of device 106, image engine 318 comprises a print engine.

According to exemplary embodiments, management device 102 is configured to access, manage and/or modify file systems 316 of individual hard imaging devices 106. Exemplary accessing includes obtaining a layout (e.g., directory tree) of the file systems 316 indicating directories, subdirectories, and contents (e.g., electronic files) of the directories and subdirectories as well as accessing the directories, subdirectories and contents. Exemplary management and modification include creating/deleting directories, moving contents of intermediate directories and/or subdirectories, copying new files or directories or subdirectories, or modifying accessing privileges of the file system 316, and selecting one or more files, or subdirectories or directories for sharing with users of client computers 103 (FIG. 1).

Upon configuring the file system 316 or its contents (e.g., directories, subdirectories, or files) as shared folders and/or files by the management device 102, users at the client computers 103 (FIG. 1) may use the native interface circuitry 312 configured to interact with the embedded virtual machine server 310 to manipulate contents of the file system 316. For example, if the entire file system 316 is configured by the management device 102 as a shared file system, a user of the client computer 103 (FIG. 1) may manipulate the contents of the file system 316, and such manipulating may include creating/deleting directories, moving contents of intermediate directories and/or subdirectories, and copying new files, etc.

On the other hand, if only a specific directory, subdirectory, or individual file(s) is configured by the management device 102 (FIG. 1) for sharing with a user of the client computer 103, then only those directories, subdirectories, or files configured as shared files/directories/sub-directories may be manipulated by a user of the client computer 103 (FIG. 1). The shared contents of the file system 316 are displayed on a web page of the hard imaging device 106. A user of the client computer 103 (FIG. 1) may browse to the web page of the hard imaging device 106 using a user interface (e.g., browser such as Internet Explorer or Netscape Navigator) and view or modify the shared contents at the respective client computer 103.

In another embodiment, if the file system 316 of the hard imaging device 106 is configured as a shared file system by the management device 102 (FIG. 1), a user of the client computer 103 (FIG. 1) may map the file system 316 of the hard imaging device to a file system 216 (FIG. 2B) that is local to the client computer 103 (FIG. 2B). It will be appreciated that a user of the management device 102 may also map the file system 316 of the hard imaging device 106 (FIG. 1) to a file system 208 (FIG. 2A) that is local to the management device 102 (FIG. 2A).

In some configurations, management device 102 may communicate electronic files comprising executable applications (e.g., applets) to one or more of hard imaging devices 106.

The described access, management and modification operations are provided to illustrate some aspects of system 100. Other operations by management device 102 and/or hard imaging devices 106 may be performed with respect to file systems 316 according to other aspects.

As mentioned previously, the accessing, management and/or modification of file systems 316 by management device 102 may be implemented in different ways. For example, mounting using an appropriate protocol is possible or mapping of the file systems 316 of hard imaging devices 106 to client computers 103 or management device 102 may be used. Other methodologies may be used in other embodiments.

Referring to FIG. 4, an exemplary methodology illustrating operations of processing circuitry 204 of the management device 102 and processing circuitry 304 of hard imaging device 106 to access and display a file system 316 of the hard imaging device 106 is shown. Other methods are possible including more, less or alternative steps.

At a step 402, hard imaging system 106 is accessed by the management device 102 by enabling a user of the management device 102 to access a web page of the hard imaging device 106 by navigating to a TCP/IP address assigned to the hard imaging device.

At a step 404, a communication may be sent from the management device 102 to the hard imaging device 106. The communication may pertain to the accessing and displaying contents of the file system.

At a step 406, the communication from the management device 102 may be received by the hard imaging device 106. The received communication may be accessed by the processing circuitry 304 of the hard imaging device 106.

At a step 408, the processing circuitry 304 operates to process the communication. The processing may include converting the received communication from one format into a format compatible with native firmware circuitry for retrieving information from the storage device of the hard imaging device 106. The retrieved information may include file system information.

At a step 410 the retrieved file system information is displayed to a user of the management device 102. The file system information may be displayed on the web page of the hard imaging device 106.

At a step 412, a user of the management device 102 may interact with the displayed file system of the hard imaging device 106. For example, the interaction may include navigating the file system of the hard imaging device 106.

As mentioned above, processing circuitry 204 of the management device 102 and processing circuitry 304 of hard imaging device 106 may share a file system 316 of the hard imaging device 106. In one sharing example, steps 402-410 may be executed as described above to provide communication between devices 102, 106 and display file system 316. Step 412 may be omitted and instead the processing circuitry 304 of the hard imaging device 106 may modify access privileges of the file system 316, or a sub-set of file system components, of the hard imaging device 106, responsive to communication from the management device 102. For example, the file system 316 or its contents may be selectively configured as shared files for sharing with users of a client computer 103 (FIG. 1). Once designated as shared files, a user of the client computer 103 may navigate to a web page of the hard imaging device 106, interact with the shared files, and may also modify contents of the shared files. Furthermore, the user of the client computer 103 (FIG. 1) may also map a directory structure of the shared files to a directory structure of a file system that is local to the client computer 103 (FIG. 1).

Advantages of the present invention include the following: remote applications may use an industry standard protocol, such as, for example HTTP protocol, to access printer file systems, thus eliminating a need for the remote applications to use vendor-specific and device-specific file system commands (e.g., such as those provided by Printer Job Language (PJL)). The present invention provides a solution to the problem of not being able to easily reference a file system content of a hard imaging device from applications executing on remote computer systems.

The protection sought is not to be limited to the disclosed embodiments, which are given by way of example only, but instead is to be limited only by the scope of the appended claims.

What is claimed is:

1. A hard imaging device file system accessing method comprising:
   providing a hard imaging device configured to form hard copy images upon media;
   providing a hard imaging management device;
   communicatively coupling the hard imaging device and the hard imaging management device to permit communication of data therebetween;

enabling a user of the management device to access a file system of the hard imaging device, the accessing performed using a web sharing communication protocol;

enabling the user to browse contents of the file system of the hard imaging device, the contents having one or more electronic files;

displaying the contents of file system to the user via a user interface; and wherein the enabling the user to access the file system comprises, using the hard imaging device, first converting communications from the user from a first format into an intermediate format and second converting the communications in the intermediate format into a second format compatible with the file system.

2. The method of claim 1, further comprising:
enabling the user to interact with the file system via the user interface.

3. The method of claim 1, wherein the web sharing communication protocol is an HTTP protocol.

4. The method of claim 2, wherein interaction with the file system comprises enabling the user to navigate the file system.

5. The method of claim 2, further comprising:
enabling the user to selectively designate the one or more electronic files of the file system for sharing with a user of a client computer having access to the hard imaging device.

6. The method of claim 5, wherein the sharing comprises enabling the user of the client computer to browse contents of the one or more electronic files configured as shared files.

7. The method of claim 5, wherein the sharing includes enabling the user of the client computer to map the one or more electronic files of the file system of the hard imaging device to a file system local to the client computer.

8. A hard imaging device file sharing method comprising:
providing a hard imaging device communicatively coupled with a communication network;
configuring a management device to access the hard Imaging device using an internet protocol;
enabling a user of the management device to browse and display a file system of the hard imaging device on a user interface of the management device; and
enabling the user to select contents of the file system for sharing with a user of a client computer having access to the hard imaging device.

9. The method of claim 8, wherein the accessing the hard imaging device comprising:

receiving internet protocol requests from the management device in a first server;
configuring the first server to convert the internet protocol requests into instructions of a first format;
receiving instructions of the first format from the first server in a second server; and
configuring the second server to convert the instructions in the first format into instructions of a second format compatible with the file system of the hard imaging device.

10. The method of claim 9, further comprising:
configuring the second server to receive and convert information from the file system of the hard imaging device into information of the first format;
configuring the first server to convert information of the first format received from the second server into a format compatible for display on the user interface of the management device.

11. The method of claim 9, wherein the internet protocol is an HTTP protocol.

12. A hard imaging device file sharing method comprising:
providing a management device, one or more client computers, and a hard imaging device, all communicatively coupled to a communication network;
accessing an electronic address of the hard imaging device using the management device;
browsing to the hard imaging device using the management device responsive to the accessing;
retrieving information regarding a hard imaging device file system responsive to the browsing;
displaying the retrieved information on a display device of the management system;
enabling a user of the management device to selectively configure contents of the file system as shared files; and
enabling users of the one or more client computers to map the shared files to a directory structure local to the one or more client computers.

13. The method of claim 12, further comprising:
enabling users of the one or more client computers to access and modify the shared files.

14. The method of claim 1 wherein the first format is not compatible with the file system.

15. The method of claim 8 further comprising displaying the file system of the hard imaging device on the user interface of the management device.

16. The method of claim 12 further comprising mapping the shared files to the directory structure local to the one or more client computers.

* * * * *

UNITED STATES PATENT AND TRADEMARK OFFICE
CERTIFICATE OF CORRECTION

| | | |
|---|---|---|
| PATENT NO. | : 8,203,731 B2 | Page 1 of 1 |
| APPLICATION NO. | : 10/458888 | |
| DATED | : June 19, 2012 | |
| INVENTOR(S) | : Curtis Reese et al. | |

It is certified that error appears in the above-identified patent and that said Letters Patent is hereby corrected as shown below:

In column 9, lines 39-40, in Claim 8, delete "Imaging" and insert -- imaging --, therefor.

Signed and Sealed this
Eighteenth Day of December, 2012

David J. Kappos
*Director of the United States Patent and Trademark Office*